US010999592B1

(12) United States Patent
Bae et al.

(10) Patent No.: US 10,999,592 B1
(45) Date of Patent: May 4, 2021

(54) ESTIMATED OPTIMAL VIDEO ENCODING PARAMETER SET SYSTEMS AND METHODS

(71) Applicant: Alibaba Group Holding Limited, Grand Cayman (KY)

(72) Inventors: Tae Meon Bae, Hangzhou (CN); Minghai Qin, Hangzhou (CN); Yen-kuang Chen, Hangzhou (CN); Guanlin Wu, Hangzhou (CN); Sicheng Li, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/857,061

(22) Filed: Apr. 23, 2020

(51) Int. Cl.
*H04N 19/50* (2014.01)
*H04N 19/196* (2014.01)
*H04N 19/154* (2014.01)

(52) U.S. Cl.
CPC .......... *H04N 19/50* (2014.11); *H04N 19/154* (2014.11); *H04N 19/196* (2014.11)

(58) Field of Classification Search
CPC ..... H04N 19/50; H04N 19/154; H04N 19/196

USPC .................................................... 375/240.12
See application file for complete search history.

(56) References Cited

U.S. PATENT DOCUMENTS

| | | | |
|---|---|---|---|
| 2015/0110193 A1* | 4/2015 | Deng | H04N 19/597 |
| | | | 375/240.16 |
| 2016/0227220 A1* | 8/2016 | Tanchenko | H04N 19/147 |

\* cited by examiner

*Primary Examiner* — Allen C Wong

(57) ABSTRACT

The systems and methods are configured to efficiently and effectively determine or find an estimated optimal encoding parameter set. In one embodiment, a video encoding parameter set estimation method comprises: performing an offline encoding parameter set characteristic prediction process that determines an estimate of a candidate encoding parameter set characteristic; and performing an encoding parameter set search process that identifies a predicted or estimated optimal video encoding parameter set. The encoding parameter set search process can include applying a constraint to the candidate encoding parameter set characteristic; and determining if candidate encoding parameter set meets an objective, wherein the determining is performed if the constraint is satisfied. The candidate encoding parameter set characteristic can be an estimated encoding time of the candidate encoding parameter set. The objective can be the best video quality out of a plurality of candidate encoding parameter sets.

20 Claims, 10 Drawing Sheets

100

110
Performing an offline encoding characteristic differential process.

120
Performing an an encoding parameter search process o.

FIG. 1

ESTIMATED OPTIMAL VIDEO ENCODING PARAMETER SET SYSTEMS AND METHODS

BACKGROUND OF THE INVENTION

Numerous areas of business, science, education, and entertainment utilize video to convey information in various important applications (e.g., medical procedures, vehicle aided operation, financial applications, etc.). Frequently, utilizing video involves processing and conveying large amounts of information. However, processing and communication bandwidth of video systems is typically limited. Some traditional systems utilize video encoding to compress data when communicating and storing the video information. Traditional encoding approaches can be problematic, expensive, and time consuming. For example, conventional video encoding can involve significant costs and consumption of resources (e.g. resources to perform encoding/decoding operations, hours of run time, etc).

Electronic systems typically utilize a codec to encode/decode (e.g., compress/decompress, etc.) video information for communication and storage. Video encoding parameters typically direct video encoding operations and have a significant impact on results. Various encoding characteristics (e.g., including video quality, encoding time, etc.) vary depending upon specific encoding parameters set selection. In a H.264 encoding scheme there are sequence encoding parameter sets and picture encoding parameter sets that include information such as picture size, option coding modes, macro-block to slice group maps, etc. Efficient and effective results often depend upon selecting a good or optimal video encoding parameter set. There are usually numerous different types and approaches to video encoding and compression. Finding solutions that provide efficient and effective results can be difficult. Searching encoding parameter sets with a brute force search typically requires very large amounts of resources and time. In one exemplary X.264 with 23 encoding parameters to select from, a video codec has 104,044,953,600,000 cases to search. As a practical matter it can be impossible to check every possible encoding parameter combination that can be included in an encoding parameter set with a real-time encoding test. To verify a real-time encoding constraint it needs to check encoding time with a candidate encoding parameter set. Traditional approaches measure real encoding time for a candidate encoding parameter set. With the assumption of 1 second encoding time per set, it can take more than 3 million years to check the encoding time of every possible candidate.

SUMMARY OF THE INVENTION

The systems and methods are configured to efficiently and effectively determine or find an estimated optimal encoding parameter set. In one embodiment, a video encoding parameter set estimation system comprises an offline encoding parameter set characteristic prediction module and an encoding parameter set search module. The offline encoding parameter set characteristic prediction module determines an estimate of encoding time of a candidate encoding parameter set from an inputted video stream. The encoding parameter set search module identifies an estimated optimal video encoding parameter set. In one embodiment, the encoding parameter set search module is configured to: apply a time constraint to the encoding time of the candidate encoding parameter set, and based upon the time constraint being satisfied, determine if candidate encoding parameter set meets a video quality objective. The encoding parameter set search module can also establish the candidate encoding parameter set as an estimated optimal parameter set when the video quality objective is met.

In one embodiment, the video quality objective is for the candidate encoding parameter set to have better video quality than a plurality of other candidate encoding parameter sets. The offline encoding parameter set characteristic prediction module can include a reference set measurement module, wherein the reference set measurement module is configured to measure an encoding time of a reference encoding parameter set. The reference set measurement module can be configured to measure a visual quality of a reference encoding parameter set. The offline encoding parameter set characteristic prediction module can include a specific value difference measurement module configured to measure an encoding time difference of a specific value encoding parameter set. The specific value difference measurement module is configured to measure a video quality difference of a specific value encoding parameter set. The encoding parameter set search module utilizes candidate encoding parameter set information and information from the offline encoding parameter set characteristic differential module.

In one embodiment, the encoding parameter set search module is configured to: compare an estimated encoding time to a time constraint; and conditioned upon satisfying the time constraint, a further search analysis of a video quality characteristic of the video encoding parameter set is performed based upon the objective. The encoding parameter set search module can be configured to establish a candidate encoding parameter set with a video quality characteristic closet to the objective as the predicted or estimated optimal video encoding parameter set.

In one embodiment, a video encoding parameter set estimation method comprises: performing an offline encoding parameter set characteristic prediction process that determines an estimate of a candidate encoding parameter set characteristic; and performing an encoding parameter set search process that identifies a predicted or estimated optimal video encoding parameter set. The encoding parameter set search process can include applying a constraint to the candidate encoding parameter set characteristic; and determining if candidate encoding parameter set meets an objective, wherein the determining is performed if the constraint is satisfied. The candidate encoding parameter set characteristic can be an estimated encoding time of the candidate encoding parameter set. The objective can be the best video quality out of a plurality of candidate encoding parameter sets.

In one embodiment, the offline encoding parameter set characteristic prediction process includes: an offline encoding characteristic differential process that determines differences in a characteristic of a reference parameter set and a characteristic of a specific value parameter set; and an encoding parameter set summation process that adds offline encoding characteristic differential values together. The offline encoding characteristic differential process can include an analysis of a characteristic based upon controlled changes to an encoding parameter of the specific value parameter set. The controlled changes make an encoding parameter in the specific value parameter set encoding different than the encoding parameters in the reference parameter set. In one embodiment, one encoding parameter is changed in the specific value parameter set to be different than the encoding parameters of the reference parameter set while the remaining parameters in both the specific value parameter set and reference parameter set are the same. In one exemplary implementation, a difference between the encoding time of the reference parameter set and the encoding time of a specific value parameter set is determined. In one exemplary implementation, a difference between the video quality of the reference parameter set and the encoding time of a specific value parameter set is determined. If an assigned characteristic value does not meet the search constraint the encoding parameter set associated with assigned value can be removed from consideration as an estimated optimal encoding parameter set. An encoding parameter search process can include dynamic programming.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which:

FIG. 1 is a block diagram of an estimated optimal video encoding parameter set method in accordance with one embodiment.

DETAILED DESCRIPTION OF THE INVENTION

Figure 2:
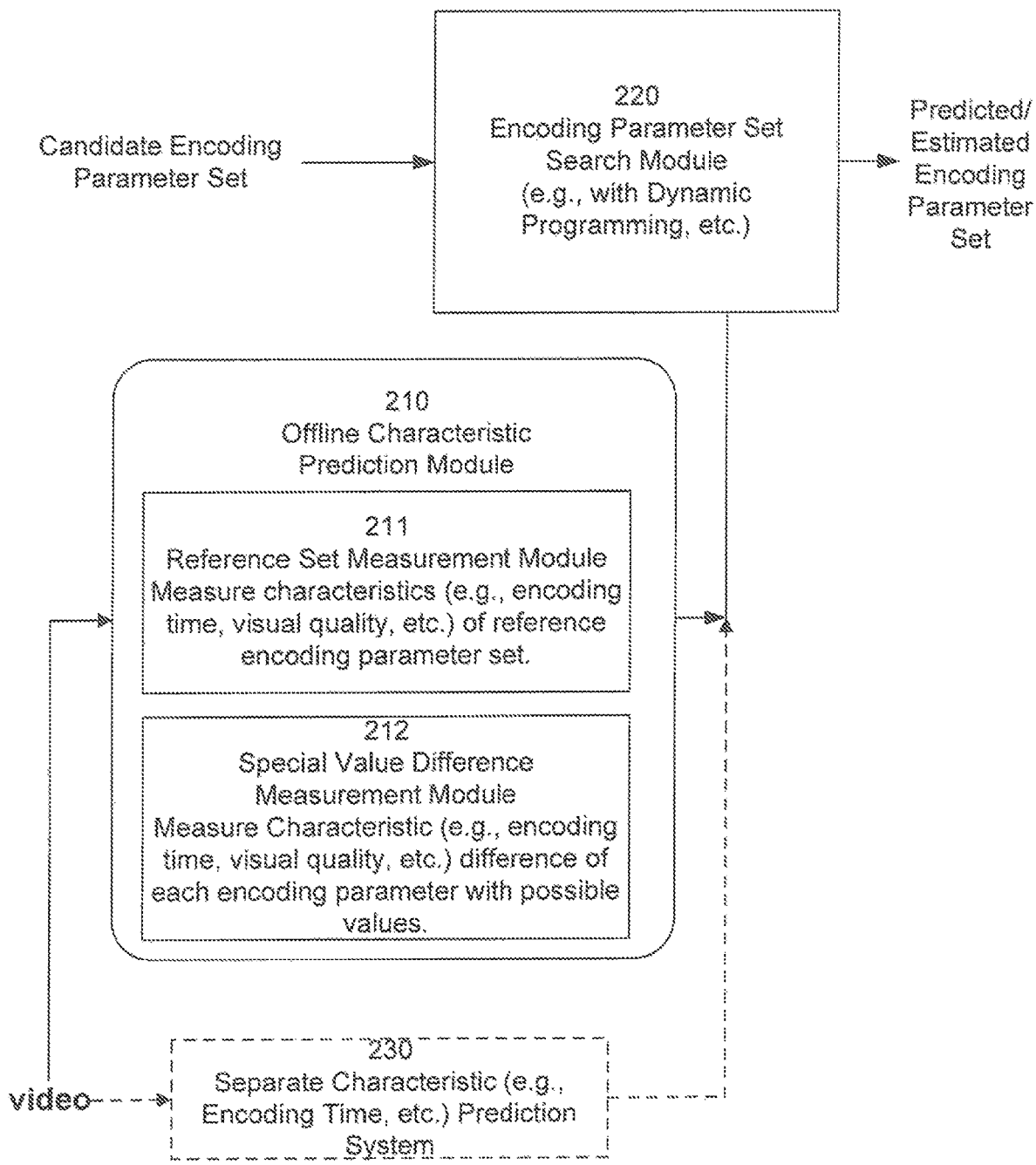
FIG. 2 is a block diagram of an estimated optimal video encoding parameter set system in accordance with one embodiment.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the phraseology and terminology used herein is for the purpose of description and should not be regarded as limiting.

The systems and methods help efficiently and effectively determine or find an estimated optimal encoding parameter set. In one embodiment, encoding parameter sets are searched to select or determine an estimated optimal video encoding parameter set. The search to determine the estimated optimal encoding parameter set is made with a video encoding time constraint. The time constraint reduces the search region in the encoding parameter space which makes it possible to relatively quickly find an estimated optimal encoding parameter set. In one exemplary implementation, an estimated optimal encoding parameter set can be determined within seconds (unlike approaches that may takes years and are impractical). In one embodiment, the search is directed at finding an encoding parameter set whose estimated or predicted encoding time is less than a time constraint and has a particular characteristic. The particular characteristic can be a certain video quality characteristic. In one exemplary implementation, the search is directed to finding the highest peak signal noise ratio (PSNR) encoding parameter set. Estimated optimal encoding parameter set selection or determination can include dynamic programming based on the video quality, an encoding parameter set predicted or estimated encoding time, and an encoding time constraint. In one embodiment, the video quality is a prediction or estimation of the video quality.

In one embodiment, video encoding time prediction or estimation is implemented. A reference encoding parameter set is defined or established and used to measure an encoding time which is used as a reference encoding time. Iterations of measuring encoding times for the reference encoding parameter set are performed in which one of the parameters in the reference parameter set is changed for an iteration and the other parameters from the reference encoding parameter set are unchanged. The difference between the reference encoding time and an individual parameter change encoding time is determined. The individual parameter change encoding times corresponding to parameters in a candidate set are added or summed together and the result is considered the predicted encoding time. The encoding time of video content by a codec or encoder with a specific encoding parameter set can be predicted or estimated without performing actual/real encoding with the specific encoding parameter set. In one exemplary implementation, the predicted encoding time can be utilized as the time constraint for the estimated optimal encoding parameter set search. In one embodiment, a H.264 or X2.64 medium preset is used as a reference encoding parameter set. A H.264 or X2.64 medium preset can be for determining or setting time encoding time constraints.

In one embodiment, a predicted or estimated optimal encoding parameter set is an approximation or estimation of an optimal encoding parameter set. An estimated optimal encoding parameter set is not necessarily the maximum optimal encoding in all respects. It may be possible that a particular encoding parameter set may have aspects or characteristics that are better in some respects than the estimated optimal encoding parameter set. However, as a general proposition determining or finding that particular encoding parameter set can take significantly longer than the estimated optimal encoding parameter set and can be impractical. Selection of an estimated video encoding parameter set can involve differences or trade offs in results. In one exemplary implementation, a video encoding parameter set that has a rapid encoding time may not have a high video quality, and a video encoding parameter set that has a slow encoding time may have a high video quality.

FIG. 1 is a block diagram of an estimated optimal video encoding parameter set method 100 in accordance with one embodiment.

In block 110, an offline encoding parameter set characteristic prediction process is performed. The offline encoding parameter set characteristic prediction process determines a predicted or estimated encoding parameter set characteristic. There can be various encoding parameter set characteristics (e.g., encoding time, video quality etc.) that are predicted or estimated. In one embodiment, an offline encoding parameter set characteristic prediction process includes an offline encoding characteristic differential process and an encoding parameter set summation process.

The offline encoding characteristic differential process determines differences in a characteristic of a reference parameter set and a characteristic of a specific value parameter set. In one embodiment, the difference in a characteristic (e.g., encoding time, video quality, etc.) of the reference parameter set and the specific value parameter set are due to a difference in an encoding parameter between the two sets. The analysis of the characteristic (e.g., visual quality, encoding time, etc.) is based upon controlled changes to an encoding parameter of the specific value parameter set. The controlled changes make an encoding parameter in the specific value parameter set encoding different than the encoding parameters in the reference parameter set. In one exemplary implementation, one encoding parameter is changed in the specific value parameter set to be different than the encoding parameters of the reference parameter set (the remaining parameters in both the specific value parameter set and reference parameter set are the same). There can be multiple characteristics (e.g., visual quality, encoding time, etc.) that are analyzed. In one embodiment, the difference between the encoding time of the reference parameter set and the encoding time of a specific value parameter set is determined. In one embodiment, the difference between the video quality of the reference parameter set and the encoding time of a specific value parameter set is determined.

The encoding parameter set summation process adds offline encoding characteristic differential values together. The offline encoding characteristic differential values come from the offline encoding characteristic differential process. In one embodiment, offline encoding characteristic differential values corresponding to parameters in a candidate encoding parameter set are added together. In one exemplary implementation, offline encoding characteristic differential encoding time values associated with parameters that are included in a candidate encoding parameter set are added together and the summation total or result is utilized as a predicted or estimated encoding time for the candidate encoding parameter set.

In block 120, an encoding parameter set search process is performed. In one embodiment, the encoding parameter search identifies a predicted or estimated optimal video encoding parameter set. The encoding parameter set search process utilizes candidate encoding parameter set information and accessing information from the offline encoding characteristic differential process in block 110. In one embodiment, a predicted or estimated characteristic value (e.g., from block 110, etc.) is assigned to a characteristic of the candidate encoding parameter set. In one embodiment, the predicted or estimated encoding time characteristic value from block 110 is assigned to the candidate encoding parameter set. A search constraint is applied to a candidate encoding parameter set characteristic. The assigned characteristic value is compared to a search constraint. A search constraint can be associated with various characteristics (e.g., encoding time, video quality, etc.) associated with a candidate encoding parameter set.

If the assigned characteristic value does not meet or is outside the search constraint the encoding parameter set associated with assigned value is removed from consideration as an estimated optimal encoding parameter set. In one embodiment, removing an encoding parameter set reduces the search field or range. Removing an encoding parameter set from the search field reduces time and resources expended on further search/analysis of other aspects (e.g., video quality, real-time encoding, etc.) of the removed encoding parameter set.

If the assigned characteristic value does meet or is within the search constraint, the further searching/analysis of encoding parameter set associated with assigned value is performed as a potential estimated optimal encoding parameter set. In one embodiment, a further search/analysis of a characteristic of the video candidate encoding parameter set is performed based upon an objective. The candidate encoding parameter set with a searched/analyzed characteristic closet to the objective is identified as the predicted or estimated optimal video encoding parameter set. In one embodiment, the characteristic is video quality associated with the encoding parameter set and the objective is to determine or find a parameter set closest to a particular video quality. In one exemplary implementation, the objective is to determine or find a parameter set with the best video quality.

In one embodiment, an encoding parameter search process includes dynamic programming. The dynamic programming can be performed with respect to search constraints and predicted or estimated characteristic values of the candidate encoding parameter set. The dynamic programming eliminates encoding parameter sets that do not meet a search constraint. In one exemplary implementation, encoding parameter sets that do not meet an encoding time constraint are eliminated. The dynamic programming continues with remaining encoding parameter sets to determine or find an encoding parameter set that meets or satisfies an objective. A candidate encoding parameter set that meets or satisfies the objective or limit is identified as the predicted or estimated optimal video encoding parameter set. In one exemplary implementation, an encoding parameter set that allows a particular video quality (e.g., best, above a threshold, etc.) to be achieved is selected as the predicted or estimated optimal encoding parameter set.

FIG. 2 is a block diagram of an estimated optimal video encoding parameter set system 200 in accordance with one embodiment. Optimal video encoding parameter set system 200 includes offline encoding parameter set characteristic prediction module 210 and encoding parameter set search module 220. In one embodiment offline encoding parameter set characteristic prediction module 201 is configured to determine an estimate of encoding time of a candidate encoding parameter set from an inputted video stream. Encoding parameter set search module 220 is configured to identify an estimated optimal video encoding parameter set. In one embodiment, the encoding parameter set search module 220 is configured to: 1) apply a time constraint to the encoding time of the candidate encoding parameter set; 2) based upon the time constraint being satisfied, determining if the candidate encoding parameter set meets a video quality objective, and 3) establish the candidate encoding parameter set as an estimated optimal parameter set when the video quality objective is met.

In one embodiment, offline encoding parameter set characteristic prediction module 210 includes reference set measurement module 211 and specific value difference measurement module 212. In one embodiment, offline characteristic prediction module 210 performs an offline encoding characteristic differential process (e.g., similar to block 110, etc.). Measurement module 211 measures a characteristic (e.g., encoding time, visual quality, etc.) of a reference encoding parameter set. Specific value difference measurement module 212 measures a characteristic (e.g., encoding time, visual quality, etc.) difference of a specific value encoding parameter set. In one embodiment, an encoding time difference between utilization of the reference encoding parameter set and the specific value encoding parameter set is measured. Encoding parameter set search module 220 performs an encoding parameter set search process. The encoding parameter set search module 220 utilizes candidate encoding parameter set information and information from the offline encoding characteristic differential module 210. A predicted or estimated characteristic of the encoding parameter set is compared to a search constraint. If the assigned characteristic value does meet or is within the search constraint, a further search/analysis of a characteristic of the video encoding parameter set is performed based upon an objective. The candidate encoding parameter set with a searched/analyzed characteristic closet to the objective is identified as the predicted or estimated optimal video encoding parameter set. In one embodiment, encoding parameter set search module 220 performs an encoding parameter set search process similar to block 120 (e.g., with dynamic programming, etc.).

There are a lot of encoding parameters that affect codec performance. Encoding parameters can include profile and level parameters, target bitrate, frame rate, resolution, number of reference frames, largest coding unit (LCU) size, group of picture (GOP) structure (e.g., length, number of bidirectional predicted picture (B) frame in GOP, etc.), entropy coding mode, CAVLC/CABAC, motion search range/shape (e.g., 16×16, 8×8, etc.), intra/inter encoding partition size, intra-coded picture (I), B, and predicted picture (P) frame initial quantization parameter (QP), node decisions, bit ratio among I, B and P frames, and so on. By optimizing encoding parameters of the target video or scene, more efficient video compression is achieved.

In one embodiment, offline operation can be performed by an optional separate characteristic prediction system 230. Separate characteristic prediction system 230 can perform a characteristic prediction or estimation for a candidate encoding parameter set characteristic. In one exemplary implementation, separate characteristic prediction system 230 performs a video encoding time prediction method.

Figure 3:
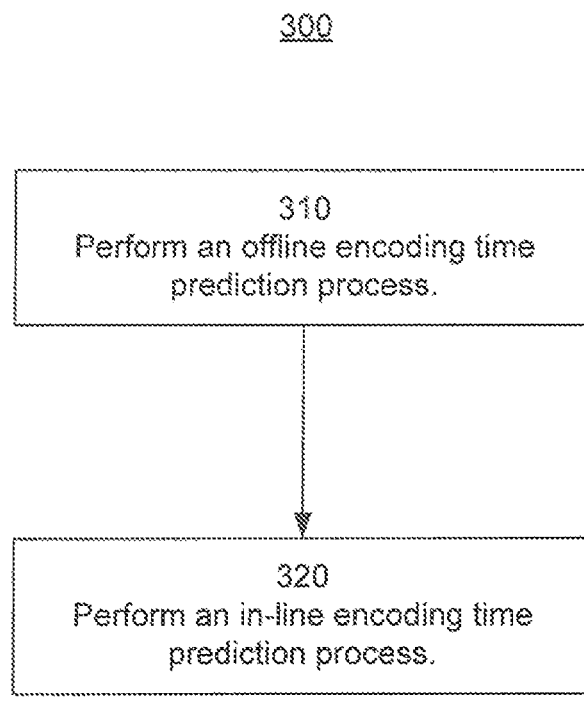
FIG. 3 is a block diagram of video encoding time prediction method in accordance one embodiment.

FIG. 3 is a block diagram of video encoding time prediction method 300 in accordance one embodiment. In one embodiment, video encoding time prediction method 300 is similar to operations of offline encoding parameter set characteristic prediction process 110. It is appreciated that portions of video encoding time prediction method 300 can be performed offline and portions can be performed inline.

In block 310, an offline encoding time prediction process is performed. In one embodiment, the offline encoding time prediction process determines or generates encoding time information corresponding to parameters in an encoding parameter set. In one exemplary implementation, the offline encoding time prediction process determines differences in encoding times of a reference parameter set and a characteristic of a specific value parameter set. In one exemplary implementation, the offline encoding time prediction process can determine multiple encoding time differences, where each one of the encoding time differences is associated with a change in a different encoding parameter.

In block 320, an in-line encoding time prediction process is performed. In one embodiment, the in-line encoding time prediction process adds or sums multiple encoding time differences from block 310 that correspond to encoding parameters of a candidate encoding parameter set. The total or result is utilized or assigned as a predicted or estimated encoding time for the candidate encoding parameter set.

Figure 4:
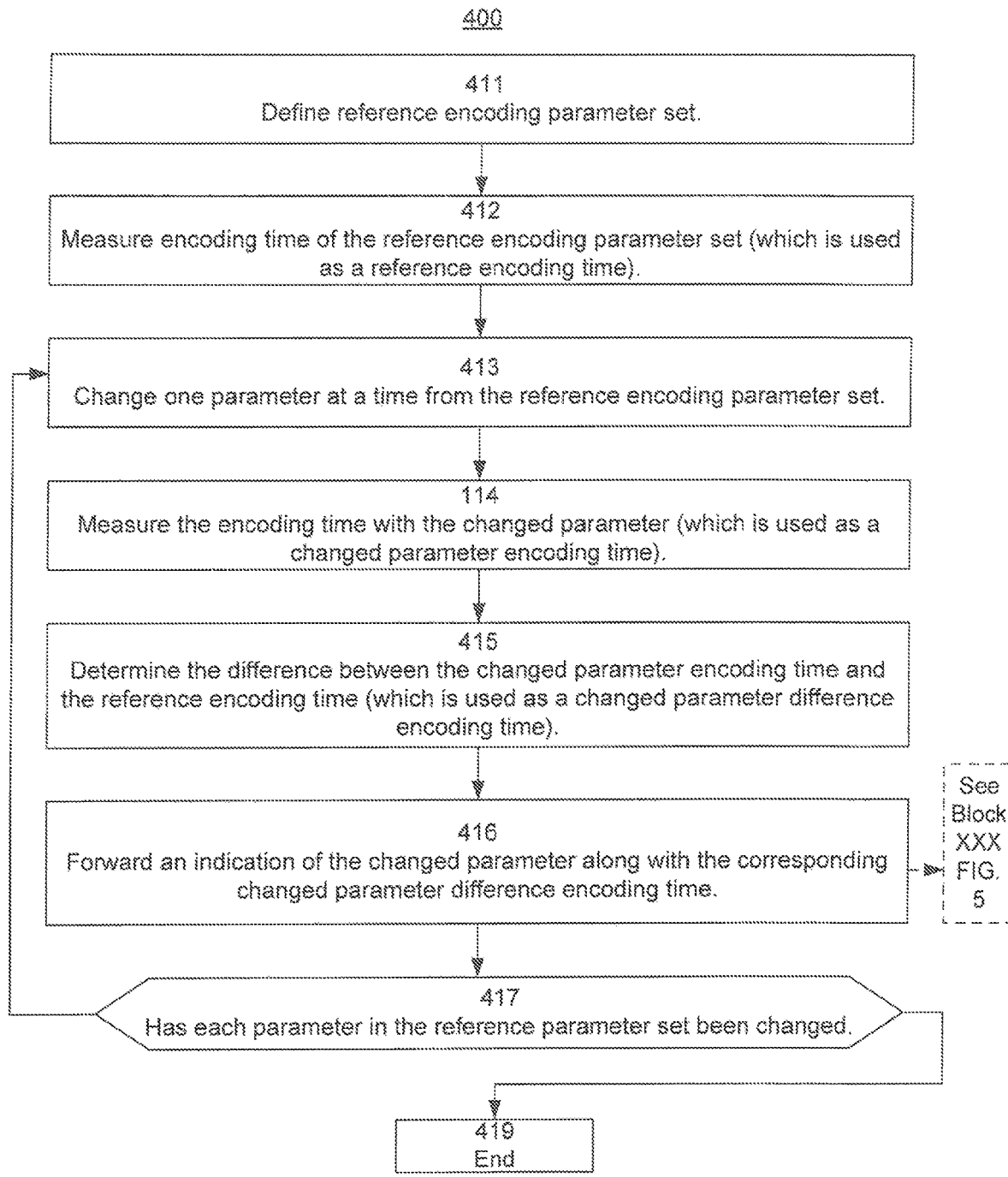
FIG. 4 is a flow chart of offline time prediction method in accordance with one embodiment.

FIG. 4 is a flow chart of offline time prediction method 400 in accordance with one embodiment. In one embodiment, offline time prediction method 400 is similar to the offline time prediction process performed in block 310.

In block 411, a reference encoding parameter set is defined. In one embodiment, the reference encoding parameter set is consistent with an encoding standard (e.g., H.264, etc.). The reference encoding parameter set can be based upon an implementation of an encoding standard. In one exemplary implementation, the reference encoding parameter set is consistent with the X.264 encoding parameter set. In one embodiment, a H.264 or X2.64 medium preset is used as a reference encoding parameter set.

In block 412, an encoding time of the reference encoding parameter set is measured. The measured time can be used as a reference encoding time.

In block 413, one parameter at a time or iteration is changed in the reference encoding parameter set.

In block 414, the encoding time with the changed parameter is measured. The measured time can be used as a changed parameter encoding time.

In block 415, the difference between the changed parameter encoding time and the reference encoding time is determined. The difference can be used as a changed parameter difference encoding time.

In block 416, an indication of the changed parameter along with the corresponding changed parameter difference encoding time is forwarded. The changed parameter difference encoding time information can be forwarded to memory for storage. In one exemplary implementation the changed parameter difference encoding time information is forwarded to an encoding time prediction process (e.g., 320, 500, etc.) or encoding time prediction module (e.g., 620).

In block 417, a determination is made if each parameter in the reference parameter set been changed. If each parameter in the reference parameter set has not been changed the process returns to step 113 and another parameter is changed is step 113. If each parameter in the reference parameter set has been changed the process proceeds to step 119.

In block 419, the process ends.

Figure 5:
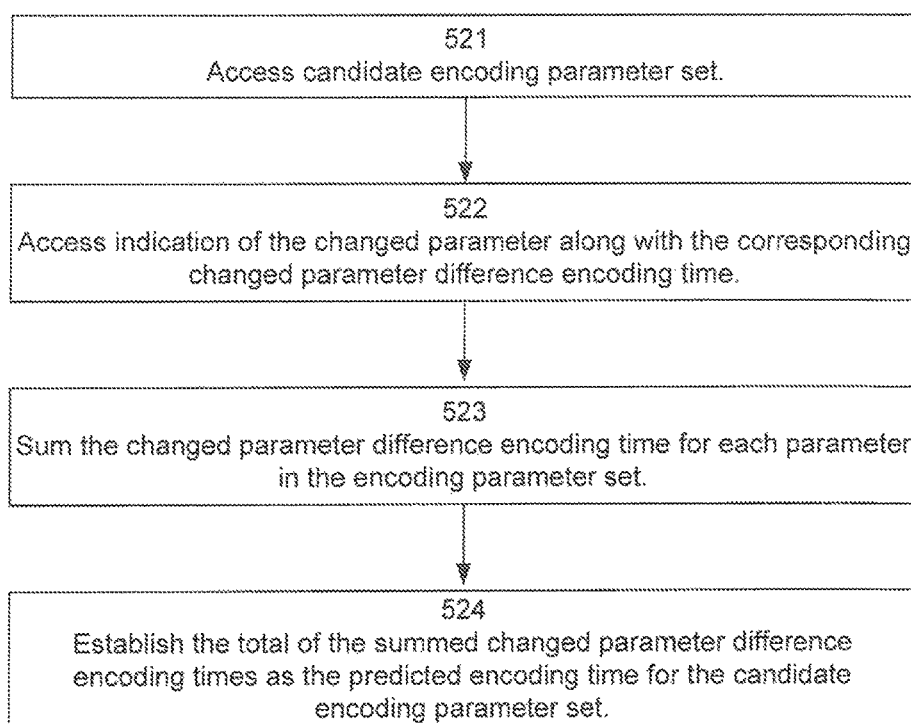
FIG. 5 is a flow chart of an exemplary in-line encoding time prediction process in accordance with one embodiment.

FIG. 5 is a flow chart of an exemplary in-line encoding time prediction process 500 in accordance with one embodiment. In one embodiment, in-line encoding time prediction method 500 is similar to the in-line encoding time prediction process performed in block 320.

In block 521, a candidate encoding parameter set is accessed.

In block 522, indications of changed parameters along with corresponding respective changed parameter difference encoding times are accessed for each parameter in the candidate encoding parameter set. In one embodiment, changed parameter difference encoding times are accessed from results of offline time prediction method 400.

In block 523, the accessed changed parameter difference encoding times from block 522 are summed.

In block 524, the total of the summed changed parameter difference encoding times is utilized as the predicted or estimated encoding time for the candidate encoding parameter set.

Figure 6:
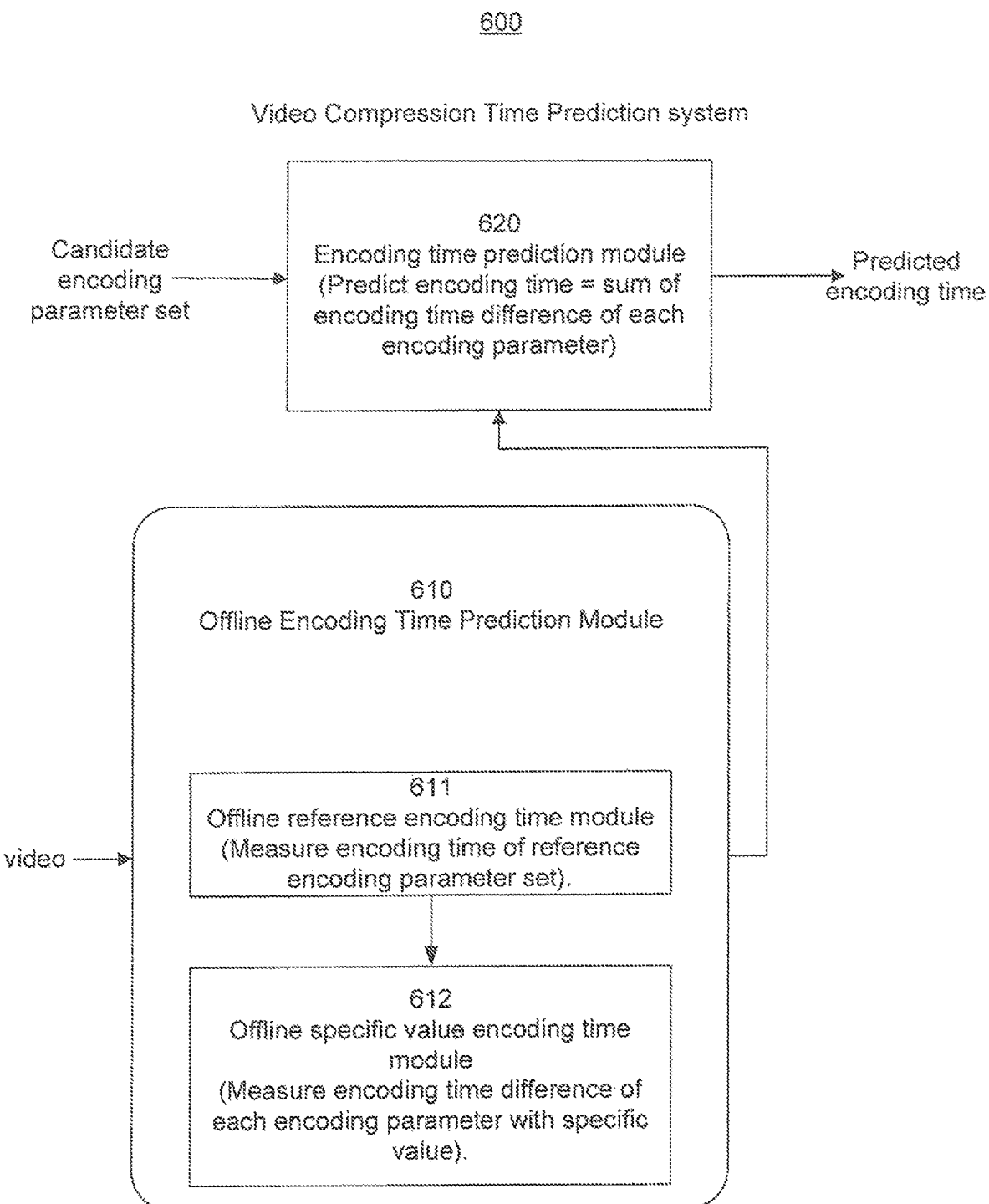
FIG. 6 is a block diagram of a video compression time prediction system in accordance with one embodiment.

FIG. 6 is a block diagram of a video compression time prediction system 600 in accordance with one embodiment. Offline time prediction module 610 is configured to provide offline encoding time prediction information. In one embodiment, offline time predictions module 610 is similar to separate characteristic prediction system 230.

In one embodiment, offline time predictions module 610 includes offline reference encoding time module 611 and offline specific value encoding time module 612. Offline reference encoding time module 611 is configured to perform measurement of a reference encoding parameter set encoding time. Offline reference encoding time module 611 forwards the measurement of the reference encoding parameter set encoding time information to offline specific value encoding time module 612. Offline specific value encoding time module 612 is configured to perform measurement of an encoding time difference associated with a changed or specific value encoding parameter in a difference of a specific value encoding parameter set. Offline time prediction module 610 can forward an encoding time difference associated with each changed encoding parameter to a memory for storage. In one exemplary implementation, offline time prediction module 610 forwards the encoding time difference for each encoding parameter to encoding time prediction module 620. Offline time prediction module 610 can forward encoding time differences to encoding time prediction module 620 for each encoding parameter in a candidate encoding set.

Encoding time prediction module 620 predicts or estimates an encoding time. In one embodiment, encoding time prediction module 620 accesses a candidate encoding parameter set and the encoding time difference for corresponding encoding parameters. Encoding time prediction module 620 can access an encoding time difference for an encoding parameter from a memory. In one exemplary implementation, encoding time prediction module 620 can access an encoding time difference for each encoding parameter from offline time prediction module 610. The encoding time prediction module 620 sums the accessed encoding time differences. The total or results of the summed accessed encoding time differences is utilized as an predicted or estimated encoding time for a candidate encoding parameter set. In one embodiment, the encoding time prediction module 620 forwards the predicted or estimated encoding time associated with a candidate encoding parameter set to an encoding parameter set search module 220.

Figure 7:
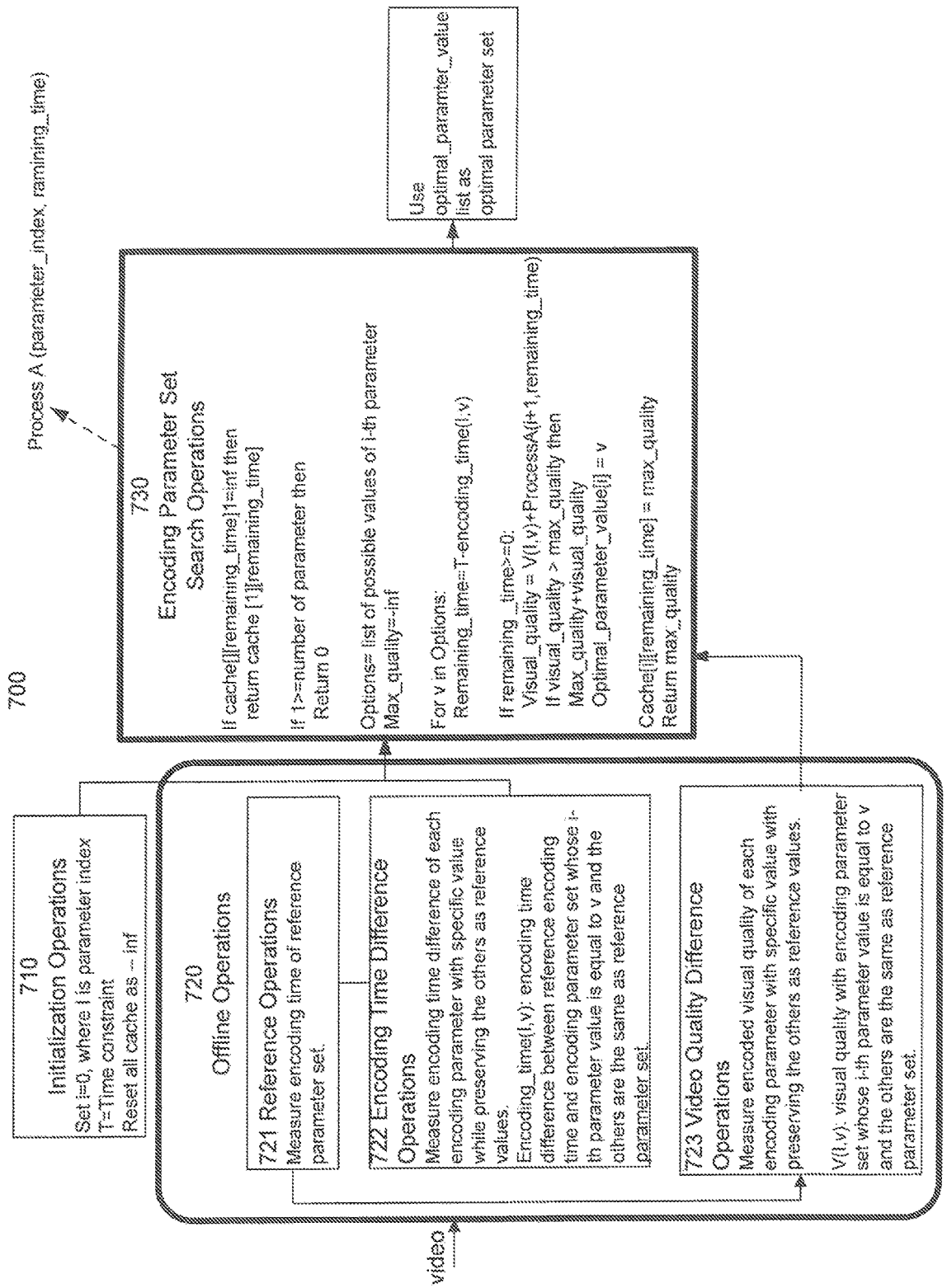
FIG. 7 is a block diagram of a system operations in accordance with one embodiment.

FIG. 7 is a block diagram of a system 700 operations in accordance with one embodiment. System 700 performs initialization operations 710, offline operations 720, and encoding parameter set search operations 730. Initialization operations 710 initializes a system for implementation of operations associated with determining an estimated optimal encoding parameter set. In one embodiment, initialization operations 710 establish a characteristic constraint on searching/analysis of the encoding parameter sets. The characteristic constraint can be an encoding time constraint on the encoding parameter sets. Offline operations 720 can implement an offline encoding time prediction process. The offline encoding time prediction process can be similar to operations in block 310. The encoding parameter set search operations 730 identify or determine a predicted or estimated optimal video encoding parameter set. The encoding parameter set search operations 730 utilizes results from initialization operations 710 and offline operations 720. In one embodiment, parameter set search operations 730 also access and utilize candidate encoding parameter set information. In one exemplary implementation, parameter set search operations 730 access a predicted or estimated encoding time for a candidate parameter set. In one embodiment, a time constraint is applied to the encoding time of the candidate encoding parameter set. Based upon the time constraint being satisfied, determining if the candidate encoding parameter set meets a video quality objective.

Establishing the candidate encoding parameter set as an estimated optimal parameter set when the video quality objective is met. In one embodiment, if the encoding time meets or satisfies the encoding time constraint, the encoding parameter set search operations 730 determine if a predicted or estimated video quality for the candidate encoding parameter set is better than other candidate encoding parameter sets. The encoding parameter set search operations 730 can be similar to encoding parameter set search process operations in block 120.

In one embodiment, a predicted or estimated characteristic value (e.g., from block 110, etc.) is assigned to a characteristic of the candidate encoding parameter set. In one embodiment, a predicted or estimated encoding time characteristic value is assigned to the candidate encoding parameter set. The assigned characteristic value is compared to a search constraint.

In one embodiment, offline operations 720 include reference operations 721, encoding time difference operations 722, and video quality difference operations 723. Reference operations 721 measure the encoding time of a reference parameter set. In one embodiment, reference operations 721 also measures the video quality of a reference parameter set. Coding time difference operations 722 measure encoding time differences of each encoding parameter with a changed corresponding respective specific value while preserving the other parameters to be the same as the parameter values of the reference encoding parameter set. Coding time difference operations 722 can implement a video encoding time prediction method. The video encoding time prediction method can be similar to operations in block 300. Video quality difference operations 723 measure video quality differences of each encoding parameter with a changed corresponding respective specific value, while preserving the other parameters to be the same as the parameter values of the reference encoding parameter set. Video quality difference operations 723 can be similar to video quality operations of block 110.

In one embodiment, found optimal encoding parameter set increases almost 1 dB compared with default parameter set in X264. In one embodiment, an estimated optimal encoding parameter set is utilized to encode video for video applications.

TABLE 1

Table 1 illustrates exemplary results of encoding time prediction results

| Contents | Prediction | Real-Time Encoding |
|---|---|---|
| First video game application | 38 | 33 |
| Second video game Application | 47 | 45 |

TABLE 2

Table 2 illustrates exemplary results of applying First video game application

| Encoding Option | PSNR (Peek Signal to Noise Ratio) | Encoding Time(sec) |
|---|---|---|
| medium | 35.44 | 38 |
| Estimated Optimal Parameter Set | 36.44 | 33 |

TABLE 3

Table 3 illustrates exemplary results of applying Second video game application

| Encoding Option | PSNR (Peek Signal to Noise Ratio) | Encoding Time(sec) |
|---|---|---|
| medium | 40.29 | 47 |
| Estimated Optimal Parameter Set | 42.09 | 45 |

Figure 8:
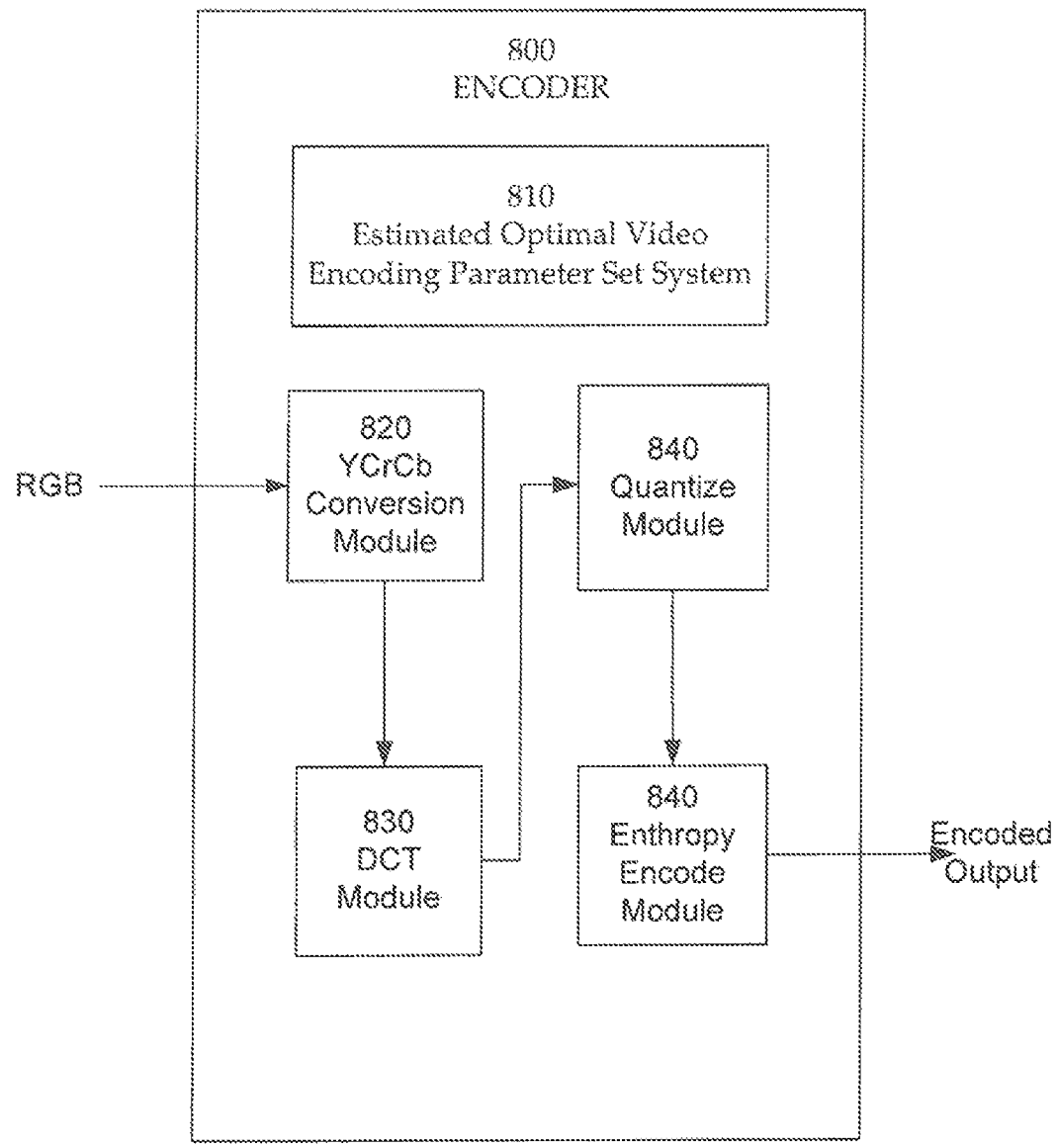
FIG. 8 is a block diagram of an exemplary encoder in accordance with one embodiment.

FIG. 8 is a block diagram of an exemplary encoder 800 in accordance with one embodiment. In one embodiment, encoder 800 can implement portions of an estimated optimal video encoding parameter set method (e.g., 100, 300, 400, 500, etc.). In one exemplary implementation, encoder 800 can include portions of an optimal video encoding parameter set system (e.g., 200, 600, 700, etc.). The encoder 800 may be referred to herein as an image processing element or as an image processor. In one embodiment, the encoder 800 can be implemented with separate dedicated hardware. The encoder 800 can include firmware. In one embodiment, the encoder 800 can be implemented using the processor 902 of FIG. 9. Using the encoder 800, the data in the RGB domain is converted into data in the YCrCb color space. A frequency domain transform (e.g., DCT) is performed to convert the YCbCr data into the frequency domain. The frequency domain data is quantized and then entropy encoded. The resulting encoded image data can be transmitted (e.g., to a decoder, to a memory for storage, etc.).

Figure 9:
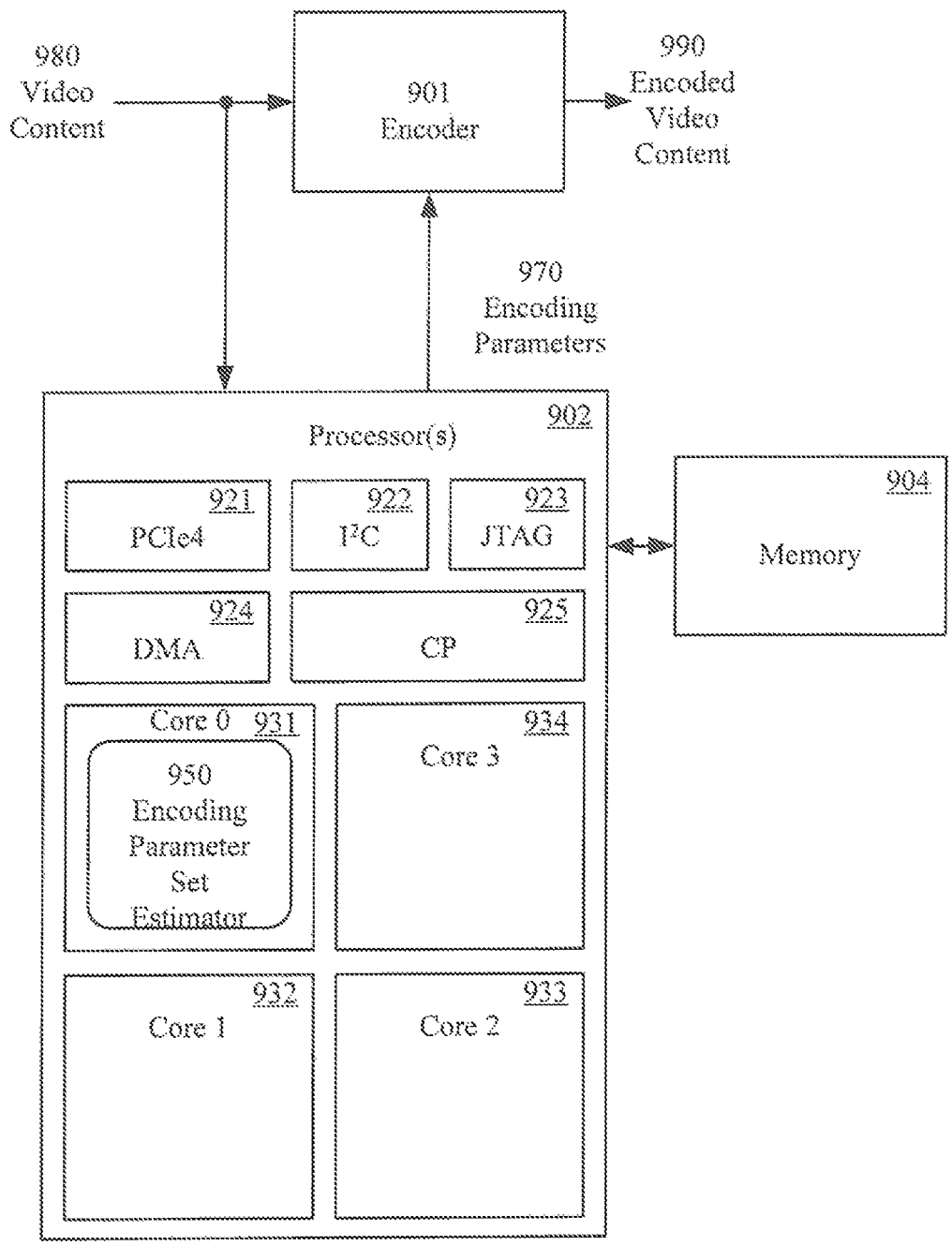
FIG. 9 is a block diagram of an exemplary computing system for processing content in accordance with one embodiment.

FIG. 9 is a block diagram of an exemplary computing system 900 for processing content in accordance with one embodiment. In one embodiment, computing system 900 can implement portions of an estimated optimal video encoding parameter set method (e.g., 100, 300, 400, 500, etc.). In one exemplary implementation, computing system 900 can include portions of an optimal video encoding parameter set system (e.g., 200, 600, 700, etc.). The computing system 900 can include processors 902, memory 904 and encoder 901. The encoders 901 can be implemented in separate hardware, or in software executing on the processes 902. In one implementation, the computing system 900 can be a server computer, a data center, a cloud computing system, a stream service system, an internet service provider system, a cellular service provider system, or the like. The processors 902 can be central processing units (CPU), graphics processing units (GPU), neural processing units (NPU), vector processors, memory processing units, or the like, or combinations thereof. In one implementation, a processor 902 can include communication interfaces, such as peripheral component interface (PCIe4) 921 and inter-integrated circuit ($I^2C$) interface 933, an on-chip circuit tester, such as a joint test action group (JTAG) engine 923, a direct memory access engine 924, a command processor (CP) 925, and cores 931-934. The cores 931-934 can be coupled in a direction ring bus configuration.

Referring still to FIG. 9, the cores 931-934 can execute sets of computing device executable instructions to perform functions or operations including, but not limited to, outputting an estimated optimal encoder parameter set 970. In one embodiment, the operations are similar to the processes described herein (e.g., 100,300, 400, 500, etc.). The functions can be performed on individual core 931-934, can be distributed across a plurality of cores 931-934, can be performed along with other functions on cores, and or the like.

The encoding parameter set estimator module 950 can be configured to estimate an optimal encoding parameter set. In one embodiment, the operations are similar to the modules in systems described herein (e.g., 200, 600, 700, etc.). In one embodiment, encoding parameter set estimator module 9950 estimates an optimal encoding parameter set similar to the methods described above with reference to FIGS. 1 and 3. The processors 902 can output encoding parameters 970. The encoder 901 can convert the video content 980 to an encoded video content 990 using the encoding parameters 970.

Figure 10:
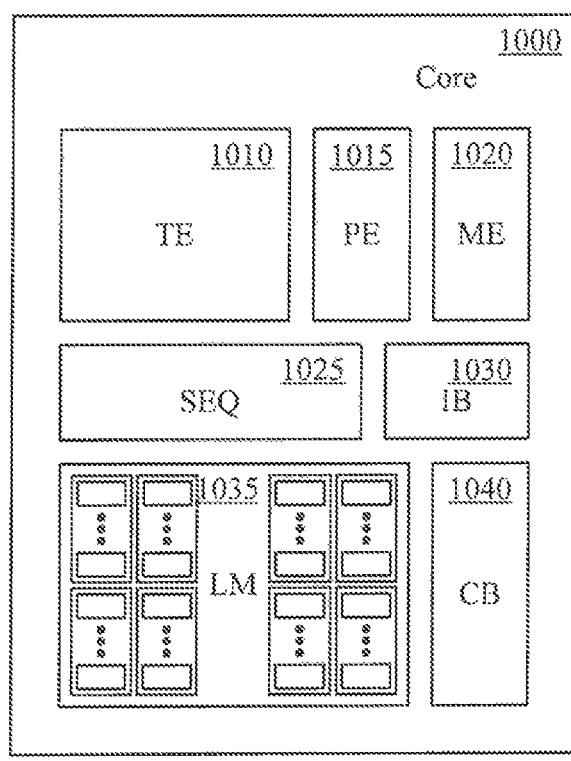
FIG. 10 is a block diagram of an exemplary processing core in accordance with one embodiment.

FIG. 10 is a block diagram of an exemplary processing core 1000 in accordance with one embodiment. In one embodiment, exemplary processing core can implement portions of an estimated optimal video encoding parameter set method (e.g., 100, 300, 400, 500, etc.). In one exemplary implementation, exemplary processing core can include portions of an optimal video encoding parameter set system (e.g., 200, 600, 700, etc.). The processing core 1000 can include a tensor engine (TE) 1010, a pooling engine (PE) 1015, a memory copy engine (ME) 1020, a sequencer (SEQ) 1025, an instructions buffer (IB) 1030, a local memory (LM) 1035, and a constant buffer (CB) 1040. The local memory 1035 can be pre-installed with model weights and can store in-use activations on-the-fly. The constant buffer 1040 can store constant for batch normalization, quantization and the like. The tensor engine 1010 can be utilized to accelerate fused convolution and or matrix multiplication. The pooling engine 1015 can support pooling, interpolation, region-of-interest and the like operations. The memory copy engine 1020 can be configured for inter- and or intra-core data copy, matrix transposition and the like. The tensor engine 1010, pooling engine 1015 and memory copy engine 1020 can run in parallel. The sequencer 1029 can orchestrate the operation of the tensor engine 1010, the pooling engine 1015, the memory copy engine 1020, the local memory 1039, and the constant buffer 1040 according to instructions from the instruction buffer 1030. The processing core 1000 can provide video coding efficient computation under the control of operation fused coarse-grained instructions. A detailed description of the exemplary processing unit core 1000 is not necessary to an understanding of aspects of the present technology, and therefore will not be described further herein.

In one embodiment, an estimation or prediction of the optimal parameter set is made. In one exemplary implementation, an assumption is made that the quality contribution of each encoding parameter is linearly independent. With encoding time prediction algorithm, searching encoding parameter space with dynamic programming reduces searching time. In one embodiment, instead of performing real-time encoding, the encoding time is predicted based on the off line or test data, thereby encoding time of any combination of encoding parameter set could be predicted in real-time.

In one embodiment, an estimated optimal video encoding parameter set system and method can be utilized to compliment other video codec tuning approaches. Content adoptive video compression technology is a state of the art solution which attempts to find optimized bitrate, resolution, and frame rate depending on the predefined genre or scene. The content adoptive compression can be based upon utilization of an artificial intelligence (AI) assisted video codec. An estimated optimal video encoding parameter set system and method can be utilized to determine other encoding parameters such as number of b frames, motion estimation method, and so on. Thereby more optimal compression efficiency can be achieved.

Traditionally, a heuristic approach is used to find out encoding time, therefore dynamic parameter control cannot be used in a conventional real-time encoding environment. In one embodiment, instead of performing real-time encoding for each particular encoding parameter set, the estimated optimal encoding parameter set method predicts or estimates aspects of encoding times offline. The encoding time can be based on the a reference parameter set and differences with one encoding parameter changed at a time (e.g., test data, off-line results, etc.), thereby encoding time of encoding parameter sets with combinations of encoding parameters can be predicted or estimated in real-time. In one embodiment, search constraints can be utilized to eliminate some candidate encoding sets without performing additional processing. In one embodiment, performing some estimated optimal encoding set selection processes offline and using search constraints to reduce/eliminate possible candidate sets enables determination of an estimated optimal encoding parameter set, that would otherwise be impossible or impractical utilizing traditional or conventional approaches.

Aspects of the present technology can advantageously estimate an optimal encoding parameter set. The estimated optimal encoder parameter set can advantageously increase the compression efficiency of the encoder. Aspects of the present technology can also advantageously eliminate the need for a brute force determination of the optimal encoding parameter set, thereby reducing computational complexity.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A video encoding parameter set estimation system comprising:
 an offline encoding parameter set characteristic prediction module that determines an estimate of encoding time of a candidate encoding parameter set from an inputted video stream; and
 an encoding parameter set search module that identifies an estimated optimal video encoding parameter set, wherein the encoding parameter set search module is configured to:
  apply a time constraint to the encoding time of the candidate encoding parameter set;
  based upon the time constraint being satisfied, determining if the candidate encoding parameter set meets a video quality objective, and
  establishing the candidate encoding parameter set as an estimated optimal parameter set when the video quality objective is met.

2. The video encoding parameter set estimation system of claim 1, wherein the video quality objective is for the candidate encoding parameter set to have better video quality than a plurality of other candidate encoding parameter sets.

3. The video encoding parameter set estimation system of claim 1, wherein the offline encoding parameter set characteristic prediction module includes a reference set measurement module, wherein the reference set measurement module is configured to measure an encoding time of a reference encoding parameter set.

4. The video encoding parameter set estimation system of claim 3, wherein the reference set measurement module is configured to measure a visual quality of a reference encoding parameter set.

5. The video encoding parameter set estimation system of claim 1, wherein the offline encoding parameter set characteristic prediction module includes a specific value difference measurement module configured to measure an encoding time difference of a specific value encoding parameter set.

6. The video encoding parameter set estimation system of claim 5, the specific value difference measurement module configured to measure a video quality difference of a specific value encoding parameter set.

7. The video encoding parameter set estimation system of claim 1, wherein the encoding parameter set search module utilizes candidate encoding parameter set information and information from the offline encoding parameter set characteristic differential module.

8. The video encoding parameter set estimation system of claim 1, wherein the encoding parameter set search module is configured to:
compare an estimated encoding time to a time constraint; and
a further search analysis of a video quality characteristic of the video encoding parameter set is performed, conditional upon satisfying the time constraint, wherein the further search analysis based upon the objective.

9. The video encoding parameter set estimation system of claim 8, wherein the encoding parameter set search module is configured to establish a candidate encoding parameter set with a video quality characteristic closest to the objective as the predicted or estimated optimal video encoding parameter set.

10. A video encoding parameter set estimation method comprising:
performing an offline encoding parameter set characteristic prediction process that determines an estimate of a candidate encoding parameter set characteristic; and
performing an encoding parameter set search process that identifies a predicted or estimated optimal video encoding parameter set, wherein the encoding parameter set search process includes:
applying a constraint to the candidate encoding parameter set characteristic; and
determining if candidate encoding parameter set meets an objective, wherein the determining is performed if the constraint is satisfied.

11. The video encoding parameter set estimation method of claim 10, wherein the candidate encoding parameter set characteristic is an estimated encoding time of the candidate encoding parameter set.

12. The video encoding parameter set estimation method of claim 11, wherein an offline encoding characteristic differential process includes an analysis of a characteristic based upon controlled changes to an encoding parameter of the specific value parameter set.

13. The video encoding parameter set estimation method of claim 12, wherein the controlled changes make an encoding parameter in the specific value parameter set encoding different than the encoding parameters in the reference parameter set.

14. The video encoding parameter set estimation method of claim 12, wherein one encoding parameter is changed in the specific value parameter set to be different than the encoding parameters of the reference parameter set while the remaining parameters in both the specific value parameter set and reference parameter set are the same.

15. The video encoding parameter set estimation method of claim 11, wherein if an assigned characteristic value does not meet the search constraint the encoding parameter set associated with assigned value is removed from consideration as an estimated optimal encoding parameter set.

16. The video encoding parameter set estimation method of claim 11, wherein an encoding parameter search process includes dynamic programming.

17. The video encoding parameter set estimation method of claim 10, wherein the objective is the best video quality out of a plurality of candidate encoding parameter sets.

18. The video encoding parameter set estimation method of claim 10, wherein the offline encoding parameter set characteristic prediction process includes:
an offline encoding characteristic differential process that determines differences in a characteristic of a reference parameter set and a characteristic of a specific value parameter set; and
an encoding parameter set summation process that adds offline encoding characteristic differential values together.

19. The video encoding parameter set estimation method of claim 18, wherein a difference between an encoding time of the reference parameter set and the encoding time of a specific value parameter set is determined.

20. The video encoding parameter set estimation method of claim 18, wherein a difference between the video quality of the reference parameter set and an encoding time of a specific value parameter set is determined.

* * * * *